United States Patent
Jing et al.

(10) Patent No.: US 8,538,699 B2
(45) Date of Patent: Sep. 17, 2013

(54) RAPID INVERSION OF ELECTROMAGNETIC RECONNAISSANCE SURVEY DATA

(75) Inventors: Charlie Jing, Houston, TX (US);
Dennis E. Willen, Houston, TX (US);
James J. Carazzone, Houston, TX (US);
Dmitriy A. Pavlov, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 451 days.

(21) Appl. No.: 12/375,188

(22) PCT Filed: Jul. 30, 2007

(86) PCT No.: PCT/US2007/016986
§ 371 (c)(1),
(2), (4) Date: Jan. 26, 2009

(87) PCT Pub. No.: WO2008/033184
PCT Pub. Date: Mar. 20, 2008

(65) Prior Publication Data
US 2009/0306900 A1    Dec. 10, 2009

Related U.S. Application Data

(60) Provisional application No. 60/844,146, filed on Sep. 13, 2006.

(51) Int. Cl.
*G01V 1/40* (2006.01)
*G01V 3/00* (2006.01)
*G01R 23/16* (2006.01)
*G06G 7/58* (2006.01)

(52) U.S. Cl.
USPC ....... 702/7; 702/6; 702/189; 703/10; 324/333

(58) Field of Classification Search
USPC ................ 702/6, 7, 189; 703/10; 324/333
See application file for complete search history.

(56) References Cited

U.S. PATENT DOCUMENTS 4,405,999 A * 9/1983 Zachariadis .............. 367/23
4,471,435 A   9/1984 Meisner .................... 364/422

(Continued)

FOREIGN PATENT DOCUMENTS

GB    2 381 137    3/2004
GB    2 390 904    12/2004

(Continued)

OTHER PUBLICATIONS

*European Search Report* dated Feb. 13, 2007 (RS 114456).

(Continued)

*Primary Examiner* — Alexander H Taningco
*Assistant Examiner* — L. Anderson
(74) *Attorney, Agent, or Firm* — ExxonMobil Upstream Research Company Law Dept.

(57) ABSTRACT

Method for rapid inversion of data from a controlled-source electromagnetic survey of a subterranean region. Selected (51) common-receiver or common-source gathers of the data are reformed into composite gathers (52) by summing their data. Each composite gather is forward modeled (in the inversion process) with multiple active source locations (53). Computer time is reduced in proportion to the ratio of the total number of composite gathers to the total number of original common-receiver or common-source gathers. The data may be phase encoded to prevent data cancellation. Methods for mitigating loss of far offset information by data overlap in the summing process are disclosed.

21 Claims, 8 Drawing Sheets

(56) References Cited

U.S. PATENT DOCUMENTS

| | | | |
|---|---|---|---|
| 4,617,518 A | 10/1986 | Srnka | 324/365 |
| 4,742,305 A | 5/1988 | Stolarczyk | |
| 4,792,761 A | 12/1988 | King et al. | |
| 4,831,383 A | 5/1989 | Ohnishi et al. | |
| 4,875,015 A | 10/1989 | Ward | |
| 4,982,374 A | 1/1991 | Edington et al. | |
| 5,050,129 A | 9/1991 | Schultz | |
| 5,175,500 A | 12/1992 | McNeill | |
| 5,189,644 A | 2/1993 | Wood | |
| 5,210,691 A | 5/1993 | Freedman et al. | |
| 5,265,192 A | 11/1993 | McCormack | |
| 5,357,893 A | 10/1994 | Ruffa | |
| 5,373,443 A | 12/1994 | Lee et al. | |
| 5,406,206 A | 4/1995 | Safinya et al. | |
| 5,410,517 A | 4/1995 | Andersen | |
| 5,467,018 A | 11/1995 | Ruter et al. | |
| 5,563,513 A | 10/1996 | Tasci et al. | |
| 5,594,343 A | 1/1997 | Clark et al. | |
| 5,629,904 A * | 5/1997 | Kosloff et al. | 367/53 |
| 5,706,194 A | 1/1998 | Neff et al. | |
| 5,715,213 A | 2/1998 | Allen | |
| 5,719,821 A | 2/1998 | Sallas et al. | |
| 5,721,710 A | 2/1998 | Sallas et al. | |
| 5,764,515 A | 6/1998 | Guerillot et al. | |
| 5,770,945 A | 6/1998 | Constable | |
| 5,790,473 A | 8/1998 | Allen | |
| 5,822,269 A | 10/1998 | Allen | |
| 5,825,188 A | 10/1998 | Montgomery et al. | |
| 5,835,883 A | 11/1998 | Neff et al. | |
| 5,841,733 A | 11/1998 | Bouyoucos et al. | |
| 5,884,227 A | 3/1999 | Rabinovich et al. | |
| 5,905,657 A | 5/1999 | Celniker | |
| 6,021,094 A | 2/2000 | Ober et al. | 367/53 |
| 6,037,776 A | 3/2000 | McGlone | |
| 6,049,760 A | 4/2000 | Scott | |
| 6,088,656 A | 7/2000 | Ramakrishnan et al. | |
| 6,094,400 A | 7/2000 | Ikellel | |
| 6,101,448 A | 8/2000 | Ikelle et al. | |
| 6,115,670 A | 9/2000 | Druskin et al. | |
| 6,138,075 A | 10/2000 | Yost | |
| 6,181,138 B1 | 1/2001 | Hagiwara et al. | |
| 6,253,100 B1 | 6/2001 | Zhdanov | |
| 6,253,627 B1 | 7/2001 | Lee et al. | |
| 6,256,587 B1 | 7/2001 | Jericevic et al. | |
| 6,278,948 B1 | 8/2001 | Jorgensen et al. | |
| 6,289,283 B1 | 9/2001 | Plasek | 702/8 |
| 6,304,086 B1 | 10/2001 | Minerbo et al. | |
| 6,311,132 B1 | 10/2001 | Rosenquist et al. | |
| 6,332,109 B1 | 12/2001 | Sheard et al. | |
| 6,339,333 B1 | 1/2002 | Kuo | |
| 6,393,363 B1 | 5/2002 | Wilt et al. | |
| 6,424,918 B1 | 7/2002 | Jorgensen et al. | |
| 6,430,507 B1 | 8/2002 | Jorgensen et al. | |
| 6,466,021 B1 | 10/2002 | MacEnany | |
| 6,470,274 B1 | 10/2002 | Mollison et al. | |
| 6,476,609 B1 | 11/2002 | Bittar | |
| 6,493,632 B1 | 12/2002 | Mollison et al. | |
| 6,502,037 B1 | 12/2002 | Jorgensen et al. | |
| 6,529,833 B2 | 3/2003 | Fanini et al. | |
| 6,533,627 B1 | 3/2003 | Ambs | |
| 6,534,986 B2 | 3/2003 | Nichols | |
| 6,593,746 B2 | 7/2003 | Stolarczyk | |
| 6,594,584 B1 | 7/2003 | Omeragic et al. | |
| 6,671,623 B1 | 12/2003 | Li | |
| 6,675,097 B2 | 1/2004 | Routh et al. | |
| 6,686,736 B2 | 2/2004 | Schoen et al. | |
| 6,711,502 B2 | 3/2004 | Mollison et al. | |
| 6,724,192 B1 | 4/2004 | McGlone | |
| 6,739,165 B1 | 5/2004 | Strack | |
| 6,765,383 B1 | 7/2004 | Barringer | |
| 6,813,566 B2 | 11/2004 | Hartley | |
| 6,816,787 B2 | 11/2004 | Ramamoorthy et al. | |
| 6,842,006 B2 | 1/2005 | Conti et al. | |
| 6,842,400 B2 | 1/2005 | Blanch et al. | |
| 6,846,133 B2 | 1/2005 | Martin et al. | |
| 6,876,725 B2 | 4/2005 | Rashid-Farrokhi et al. | |
| 6,883,452 B1 | 4/2005 | Gieseke | |
| 6,888,623 B2 | 5/2005 | Clements | |
| 6,901,029 B2 | 5/2005 | Raillon et al. | |
| 6,901,333 B2 | 5/2005 | Van Riel et al. | |
| 6,914,433 B2 | 7/2005 | Wright et al. | |
| 6,950,747 B2 | 9/2005 | Byerly | |
| 6,957,708 B2 | 10/2005 | Chemali et al. | |
| 6,958,610 B2 | 10/2005 | Gianzero | |
| 6,985,403 B2 | 1/2006 | Nicholson | |
| 6,993,433 B2 | 1/2006 | Chavarria et al. | |
| 6,999,880 B2 | 2/2006 | Lee | |
| 7,002,349 B2 | 2/2006 | Barringer | |
| 7,002,350 B1 | 2/2006 | Barringer | |
| 7,023,213 B2 | 4/2006 | Nicholos | |
| 7,039,525 B2 | 5/2006 | Mittet | |
| 7,062,072 B2 | 6/2006 | Anxionnaz et al. | |
| 7,092,315 B2 | 8/2006 | Olivier | |
| 7,109,717 B2 | 9/2006 | Constable | |
| 7,114,565 B2 | 10/2006 | Estes et al. | |
| 7,116,108 B2 | 10/2006 | Constable | |
| 7,126,338 B2 | 10/2006 | MacGregor et al. | |
| 7,142,986 B2 | 11/2006 | Moran | |
| 7,187,569 B2 | 3/2007 | Sinha et al. | |
| 7,191,063 B2 | 3/2007 | Tompkins | |
| 7,203,599 B1 | 4/2007 | Strack et al. | |
| 7,227,363 B2 | 6/2007 | Gianzero et al. | |
| 7,250,768 B2 | 7/2007 | Ritter et al. | |
| 7,257,049 B1 | 8/2007 | Laws et al. | |
| 7,262,399 B2 | 8/2007 | Hayashi et al. | |
| 7,262,602 B2 | 8/2007 | Meyer | |
| 7,307,424 B2 | 12/2007 | MacGregor et al. | |
| 7,337,064 B2 | 2/2008 | MacGregor et al. | |
| 7,347,271 B2 | 3/2008 | Ohmer et al. | |
| 7,356,412 B2 | 4/2008 | Tompkins | |
| 7,362,102 B2 * | 4/2008 | Andreis | 324/365 |
| 7,382,135 B2 | 6/2008 | Li et al. | |
| 7,400,977 B2 | 7/2008 | Alumbaugh et al. | |
| 7,411,399 B2 | 8/2008 | Reddig et al. | |
| 7,453,763 B2 | 11/2008 | Johnstad | |
| 7,477,160 B2 | 1/2009 | Lemenager et al. | |
| 7,502,690 B2 | 3/2009 | Thomsen et al. | |
| 7,542,851 B2 | 6/2009 | Tompkins | |
| 7,659,721 B2 | 2/2010 | MacGregor et al. | |
| 7,683,625 B2 | 3/2010 | Milne et al. | |
| 7,884,612 B2 | 2/2011 | Conti et al. | |
| 7,928,732 B2 | 4/2011 | Nicohls | |
| 7,979,211 B2 * | 7/2011 | Lu et al. | 702/16 |
| 7,987,074 B2 * | 7/2011 | Carazzone et al. | 703/2 |
| 2002/0172329 A1 | 11/2002 | Rashid-Farrokhi et al. | |
| 2005/0077902 A1 | 4/2005 | MacGregor | 324/334 |
| 2005/0128874 A1 | 6/2005 | Herkenhoff et al. | |
| 2005/0237063 A1 | 10/2005 | Wright et al. | |
| 2005/0251340 A1 | 11/2005 | Tompkins | 702/2 |
| 2006/0018191 A1 | 1/2006 | Kappius | 367/38 |
| 2006/0186887 A1 | 8/2006 | Strack et al. | |
| 2007/0280047 A1 | 12/2007 | MacGregor et al. | |
| 2007/0288211 A1 | 12/2007 | MacGregor et al. | |
| 2008/0007265 A1 | 1/2008 | Milne et al. | |
| 2008/0105425 A1 | 5/2008 | MacGregor et al. | |
| 2008/0106265 A1 | 5/2008 | Campbell | |
| 2009/0006053 A1 | 1/2009 | Carazzone et al. | 703/5 |
| 2009/0133870 A1 * | 5/2009 | Pavlov et al. | 166/250.16 |

FOREIGN PATENT DOCUMENTS

| | | |
|---|---|---|
| GB | 2 395 563 | 12/2004 |
| GB | 2 402 745 | 8/2005 |
| GB | 2 411 006 | 1/2006 |
| GB | 2 415 785 | 1/2006 |
| GB | 2 423 370 | 2/2006 |
| GB | 2 413 851 | 8/2006 |
| GB | 2 410 635 | 12/2006 |
| GB | 2 416 845 | 12/2006 |
| GB | 2 423 370 | 5/2007 |
| GB | 2 427 482 | 5/2007 |
| GB | 2 431 474 | 5/2008 |
| WO | WO 98/07050 | 2/1998 |
| WO | WO 98/28636 | 7/1998 |
| WO | WO 03/034096 | 4/2003 |

| | | |
|---|---|---|
| WO | WO 2004/003589 | 1/2004 |
| WO | WO 2004/008183 | 1/2004 |
| WO | WO 2004/053528 | 6/2004 |
| WO | WO 2004/086090 | 10/2004 |
| WO | WO 2004/109338 | 12/2004 |
| WO | WO 2005/006022 | 1/2005 |
| WO | WO 2005/081016 | 9/2005 |
| WO | WO 2006/026361 | 3/2006 |
| WO | WO 2006/037815 | 4/2006 |
| WO | WO 2006/052145 | 5/2006 |
| WO | WO 2006/073315 | 7/2006 |
| WO | WO 2006/089269 | 8/2006 |
| WO | WO 2006/091461 | 8/2006 |
| WO | WO 2007/135359 | 11/2007 |
| WO | WO 2007/136276 | 11/2007 |
| WO | WO 2008/045594 | 4/2008 |
| WO | WO 2008/054880 | 5/2008 |
| WO | WO 2008/062024 | 5/2008 |

OTHER PUBLICATIONS

*International Search Report & Written Opinion* dated Apr. 2, 2008 for PCT/US2007/016986.

Allen, J. (1977), "A Unified Approach to Short-Time Fourier Analysis and Synthesis," *Proc. of the IEEE* 65, pp. 1558-1564.

Alumbaugh, et al. (1997), "3-D massively parallel electromagnetic inversion—Part II. Analysis of a cross well experiment," *Geophysical J. Intl.* 128, pp. 355-363.

Chave, A.D. et al. (1991), "Electrical Exploration Methods of the Seafloor," *Investigations in Geophysics No. 3, Electromagnetic Methods in Applied Geophysics*, Society of Exploration Geophysicists 2, edited by Misac N. Nabighian, pp. 931-966.

Choi, H. et al. (1989), "Improved time-frequency representation of multicomponent signals using exponential kernels," *IEEE Trans. on Acoust., Speech and Signal Processing* 37, pp. 862-871.

Coggon, J.H (1971), "Electromagnetic and Electrical Modeling by Finite Element Method," *Geophysics* 36, pp. 132-155.

Commer, M. et al. (2004), "A parallel finite-difference approach for 3D transient electromagnetic modeling galvanic sources," *Geophysics* 69, pp. 1192-1202.

Constable, S. et al. (2006), "Mapping thin resistors and hydrocarbons with marine EM methods: Insights from 1D modeling," *Geophysics* 71, pp. G43-G51.

Jing, X. et al. (2000), "Encoding multiple shot gathers in prestack migration," $70^{th}$ Annual International Meeting, SEG, Expanded Abstracts, pp. 786-789.

Julien, P. et al. (1990), "3-D Prestack Depth Migration on Real Data," $60^{th}$ Annual International Meeting, SEG, Expanded Abstracts, pp. 1329-1332.

Newman G.A. et al. (1997), "Three-dimensional massively parallel electromagnetic inversion-I. Theory," *Geophysics J. Int.* 128, pp. 345-354.

Sasaki, Y. (2001), "Full 3-D inversion of electromagnetic data on PC," *J. of Applied Geophysics* 46, pp. 45-54.

Barbier, M.G. et al. (1974), "Pulse Coding in Seismic Prospecting Sosie and Seiscode," *Geophysical Prospeting* 22, pp. 153-175.

Julien, P. et al., (1990), "3-D Prestack Depth Migration on Real Data," *SEG Expanded Abstracts,* pp. 1329-1332.

Sheriff, R.E. (2002), "Encyclopedia Dictionary of Applied Geophysics," Society of Exploration Geophysicists, $4^{th}$ Edition, pp. 87, 313.

\* cited by examiner

RAPID INVERSION OF ELECTROMAGNETIC RECONNAISSANCE SURVEY DATA

This application is a National stage entry under 35 U.S.C. 371 of PCT/US2007/016986 that published as WO 2008/033184 and was filed on Jul. 30, 2007 and claims the benefit of now expired U.S. Provisional application 60/844,146 which was filed on Sep. 13, 2006.

FIELD OF THE INVENTION

The present invention relates generally to the field of geophysical prospecting, and more particularly to processing data from a controlled-source electromagnetic ("CSEM") survey of a subterranean region. Specifically, the invention is a method for rapid inversion of electromagnetic data for physical properties of the subsurface medium, such as subsurface rock conductivity/resistivity which is useful in hydrocarbon prospecting.

BACKGROUND OF THE INVENTION

The CSEM technique is an important geophysical tool for hydrocarbon prospecting in the earth's subsurface. In a CSEM survey, an electromagnetic-wave source (transmitter) generates an electromagnetic wave. The electromagnetic signal induced in the earth by the transmitter is recorded constantly in time by one or more receivers. The electromagnetic signal at a receiver location depends on physical properties, especially the electrical properties, of the medium in which the electromagnetic wave has passed through from the source to the receiver. The behavior of this signal as a function of frequency and transmitter location or separation (offset) between transmitter and receiver can be used to estimate the spatially varying resistivity model of the subsurface within a certain depth range. This estimated subsurface resistivity model is used for identifying resistivity anomalies indicating the presence of hydrocarbons (oil or gas) in the earth's subsurface.

FIG. 1 illustrates a typical marine CSEM survey in which a constantly active electromagnetic-wave transmitter 11 is towed below the water surface 15 along a line 12 above electromagnetic receivers 13 (two neighboring receivers are shown) deployed on the seafloor 14. Reference number 16 indicates the offset between the right-most receiver and the source when the source is at location 11A. For more details see Chapter 12, page 931 in *Investigations In Geophysics No. 3, Electromagnetic Methods In Applied Geophysics*, volume 2, edited by Misac N. Nabighian, Society of Exploration Geophysicists, 1991). Alternative configurations include stationary transmitters on the seafloor or in the water column as well as magnetic transmitter antennae and connecting several receivers in a towed array (see, for example, U.S. Pat. No. 4,617,518 to Srnka). The receivers typically have multiple sensors designed to record different vector components of the electric and/or magnetic fields. A sensor is also called a channel. The data recorded in one channel correspond to one vector component of the electromagnetic field. Every receiver records the electromagnetic signal constantly in time during a survey. The data recorded by one sensor at a receiver location are normally called a common-receiver gather, or simply called a receiver gather. Under the stationary-receiver configuration, a common-receiver gather represents the electromagnetic signal at the fixed receiver location induced by the source at all different source locations, or at different times during the survey. Similarly, data can also be sorted in common-source gathers to represent the electromagnetic field at those receiver locations from a source at a fixed source location.

Marine CSEM data are typically interpreted in the temporal frequency domain. After taking out the frequency-dependent effects of the source and the receiver themselves, the signal at a frequency represents the response of the earth to electromagnetic signal at that temporal frequency. It is this response that provides us information about the subsurface electrical properties. Like any other type of wave, the electromagnetic signal in a CSEM survey has two attributes, amplitude and phase. The signals are therefore conveniently represented as complex numbers in either rectangular (real-imaginary) or polar (amplitude-phase) form.

In practice, the receiver data are usually converted to temporal frequency by dividing (or "binning") the recorded time-domain data into time intervals (i.e. bins: $x_1$, $x_2$, and $x_3$ as shown in FIG. 2A) and determining the spectrum within each bin by standard methods based on the Fourier Transform. The signal recorded by a receiver is 21 and, for reference, the transmitted periodic waveform 22 is also shown. FIG. 2B shows the amplitudes of the spectral components from the bin $x_3$. Unlike the example shown in FIG. 2A, a typical bin length is several periods of the transmitter waveform. Each bin might correspond to a different position of the source arrow 11 in FIG. 1. Some methods of transforming data to the time-frequency domain include the Short-Time Fourier Transform (J. Allen, L. Rabiner, "A Unified Approach to Short-Time Fourier Analysis and Synthesis," *Proc. of the IEEE* 65, 1558-64, (1977)); and the Choi-Williams transform (H. Choi and W. Williams, "Improved time-frequency representation of multicomponent signals using exponential kernels," *IEEE Trans. on Acoust., Speech, and Signal Processing*, 37, 862-871, (1989)). In the temporal-frequency domain, signals recorded by a receiver, including both amplitude and phase, of each of the temporal-frequency components are functions of bin, or the transmitter location, or the signed offset distance between source and receiver. FIGS. 3A-B show an example of amplitude (3A) and phase (3B) variation versus transmitter-receiver offset at frequency ⅜ Hz. The drawings represent model calculations with the solid-line curves representing a resistivity model containing a hydrocarbon (high resistivity) layer, whereas the dashed line curves were generated using a resistivity model without a reservoir. As shown in the drawings, both the phase and amplitude of CSEM data can be indicative of resistive (and potentially hydrocarbon-bearing) strata in the subsurface, and can thus be used to estimate the subsurface rock electrical conductivity or resistivity. Hydrocarbon bearing rocks usually show higher resistivity than the surrounding sediments. The differences between the solid-line curves and the dashed-line curves show how CSEM data may be used to detect the presence of hydrocarbons. Thus, the subsurface rock resistivity information derived from the CSEM data is valuable for hydrocarbon exploration risk reduction.

The estimation of the subsurface resistivity (or conductivity) model in three-dimensional (3-D) space from measured CSEM data is an inverse problem. Solving an inverse problem is a trial-and-error iterative process. The final estimated model should be able to predict data that match the measured data and satisfy any constraints that may be applicable to the model.

This process (i.e. updating the resistivity model for the next iteration) can be either human-guided manual adjustment of the subsurface resistivity model or an automatic model update predicted from some appropriate mathematical measures of the misfit between measured and the predicted data. See for example, G. A. Newman and D. L. Alumbaugh, "Three-dimensional massively parallel electromagnetic inversion—I. Theory," Geophys. J. Int., 128, 345-354 (1997) and Y. Sasaki, "Full 3-D inversion of electromagnetic data on PC," J. of Applied Geophys., 46, 45-54, (2001), or a combination of the two. The prediction of electromagnetic data from a resistivity model of the subsurface is achieved by numerically solving Maxwell's electromagnetic field equations, a process called forward modeling.

In many examples of CSEM hardware, data cannot be effectively recorded at the nearest offsets because the dynamic range of the receiver's digitizers is too small to accommodate the large dynamic range of the data. This region is sometimes known as the "saturation zone" and typically encompasses source-receiver offsets of less than 500 meters depending on amplifier property of the receiver. An example is shown in FIG. 3A, in which constant amplitude is observed for offset roughly within 500 m.

The inversion of CSEM data for the subsurface conductivity is a computationally intensive process, since it involves many forward simulations of the electromagnetic field in multi-dimensional space. To speed up the inversion process in multi-dimensional space, such as 2-D or 3D space, the model-update prediction is derived from the forward modeling and the transmitter-receiver reciprocity property can be used to reduce the number of forward modeling operations; see the previously cited Newman and Alumbaugh reference, and also U.S. Provisional Patent Application No. 60/780,232. By using the reciprocity principle (switching the role of a transmitter and a receiver), the electromagnetic fields in one entire receiver gather (as shown in FIGS. 3A-B) can be obtained in one forward modeling operation by calculating the electromagnetic fields at those original transmitter locations from a transmitter located at the original receiver location. In the traditional frequency-domain inversion process, every receiver gather needs to be forward simulated separately and compared to the measured data. The number of receiver gathers to be simulated in a survey is the product of the number of receivers deployed, frequencies to be used, and the number of components of each receiver. If the inversion is performed in time domain, the number of forward simulations is proportional to the number of receiver or source gathers in a survey depending on whether the transmitter-receiver reciprocity is used. The large number of independent forward simulations required in the current inversion techniques discourages its application to large 3-D surveys, such as reconnaissance surveys covering large area with regularly spaced receivers as illustrated by an example in FIG. 4. Techniques leading to a substantial speedup of CSEM data inversion in multi-dimensional space are crucial for its application in 3-D surveys. The present invention fulfills this need.

FIG. 4 shows a surface map view of a typical data acquisition pattern for a CSEM reconnaissance survey. The distribution of receivers (indicated by both black and white arrows) on a regular 2-D grid is shown as well as a set of parallel transmitter towlines (dashed lines); the receiver interval is usually several kilometers. Acquiring data along a regular grid is natural for CSEM reconnaissance, where a priori information about the subsurface is limited.

Current methods of CSEM data inversion will next be examined in somewhat more detail. As previously stated, CSEM data inversion is an iterative method for determining the resistivity of the subsurface from CSEM data measured at the earth's surface or seafloor. The result of inversion is a geo-electric model of the subsurface obtained by updating a starting model of the earth resistivity to minimize the mismatch between measured and simulated data. The model update from iteration to iteration can be achieved by either human-guided manual adjustment of the resistivity model or an automatic model update predicted from some appropriate mathematical measures of the misfit between measured and the predicted data (see for example, G. A. Newman and D. L. Alumbaugh, op. cit.) or a combination of the two.

Most of the geological and electrical information that may be available about the subsurface, such as structural and rock physical property information from seismic data and electrical property information from available well measurements, can be taken into account by human-guided manual model updates more easily than by automatic model updates predicted from some appropriate mathematical measures of the mismatch between measured and the predicted data. However, the human-guided manual model update becomes awkward as the survey size and/or the subsurface geology complexity increases. This is especially true for 3D inversion due to the great flexibility in updating the model in 3-D space.

Most of the current inversion procedures adopt some automatic model-update schemes based on numerical optimization procedures which adjust subsurface resistivities and possibly other parameters until the defined objective function is reduced to a sufficiently small value. The objective function usually includes term(s) describing the data mismatch between the forward simulated data and the measured data and other term(s) describing some geological information inputs and constraints. Some model constraints may also be enforced directly in the model-update process. The inversion process drives the model along the direction of reducing the data mismatch and satisfying any geological constraints included either in the objective function or enforced in the model-update process.

These inverted models from either manual or automatic model-update processes should be able to produce synthetic CSEM data that accurately match the measured data. Inversions using either of the model-update procedures outlined above require repeated solution of Maxwell's equations (or forward modeling) for a large number of models and transmitter-receiver configurations. The forward modeling of CSEM data in 3D space is computationally intensive and it dominates the computational time and costs in the CSEM data inversion (see, for example, D. L. Alumbaugh and G. A. Newman, "3-D massively parallel electromagnetic inversion—Part II, Analysis of a cross well experiment," Geophys. J. Int. 128, 355-363 (1997)). Under some simple situations, the subsurface resistivities might be approximated by a 1-D layered model which limits any variation of resistivity along the horizontal direction for more efficient forward modeling and inversion (see, for example, S. Constable and C. J. Weiss, "Mapping thin resistors and hydrocarbons with marine EM methods: Insights from ID modeling", Geophysics 71, G43-G51, (2006)). In general, such simplification is not accurate enough for application in hydrocarbon exploration.

There exist several forward-modeling schemes for the simulation of electromagnetic wave propagation. The commonly-used ones for general 3-D models are the finite-difference method, hereinafter "FDM", the finite element method, hereinafter "FEM", and the integral equation method, hereinafter "IEM." These are the standard approaches for numerically solving any partial differential equation (s) that cannot be solved analytically. In practical applications of these methods, the physical properties, such as the resistivity and dielectric permittivity, are represented by discrete cells in the whole space of interest, or in a localized zone for some special applications of the IEM. The governing equations, Maxwell's equations for CSEM applications, are represented in discrete forms on the cell grids for both FDM and FEM and are used to solve the electromagnetic field numerically over the cell grids. The FDM normally uses rectangular cells without assuming any particular geometric structures of the physical property in space (G. A. Newman and D. L. Alumbaugh, op. cit.). The FEM normally uses more general geometric shapes than rectangles (J. H. Coggon, "Electromagnetic and Electrical Modeling by Finite Element Method", *Geophysics* 36, 132-155 (1971)) that are able to represent the model in more detail than the FDM at the expense of more complex model representation and governing equations over the cell grids.

The IEM recasts the system of differential equations implied by Maxwell's equations into an associated integral equation by making use of the properties of the Green's function for the electric and/or magnetic field in a uniform or layered model. A uniform or layered material is typically used for the reference Green's function because highly accurate and rapidly computed solutions are available for these models. The resulting integral equations naturally give rise to computational schemes that work very well for compact objects imbedded in a uniform or layered background (such as a ship in the deep ocean or an aircraft high in the atmosphere).

The forward modeling methods described in the preceding paragraphs can be applied in both time and frequency domain (for time domain example, see for example, M. Commer and G. A. Newman, "A parallel finite-difference approach for 3D transient electromagnetic modeling galvanic sources", *Geophysics*. 69, 1192-1202 (2004)). Forward modeling CSEM data in the time domain offers advantages in handling the so-called air-wave effect in land or shallow water surveys (the air wave is the direct transmission from the broadcasting antenna to the detecting antenna through the air). However, it is computationally more costly than in frequency domain due to the large number of time steps needed to simulate the propagation of electromagnetic waves in the model.

All of the preceding forward-modeling approaches in frequency domain result in a very large linear system to solve. The large size of the linear system combined with the large number of forward modelings needed for a survey makes the forward modeling time consuming. A powerful computer is often needed in order to obtain results in a reasonable time. A number of techniques have been developed to speed up the computation at different stages of the inverse process. For example, more efficient optimization techniques such as the non-linear conjugate gradient (NLCG) solver, multi-grid solvers, approximate computation of the sensitivity matrix, source-receiver reciprocity, etc. All those techniques are helpful, but more improvements are needed to make electromagnetic inversion in 3D space a routine practice with reasonable computer resources.

SUMMARY OF THE INVENTION

In one embodiment, the invention is a computer-implemented method for rapid inversion of electromagnetic data from a controlled source electromagnetic survey of a subterranean region, comprising:

(a) summing measured electromagnetic survey data to form one or more composite gathers, each composite gather being formed from at least two selected ordinary gathers, said ordinary gathers being either common-receiver or common-source gathers; and (b) inverting the composite gathers for a subsurface electrical-property parameter such as resistivity.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

The present invention is designed to speed up forward modeling and thus the inversion process by reducing the effective number of forward synthetics needed in a survey. This is achieved by simulating multiple transmitter configurations simultaneously in one simulation. The present invention is not limited to any particular forward-modeling method or methods, or any particular technique(s) of speeding up the forward solution for a particular transmitter configuration. It can be applied jointly with other techniques to achieve higher speedup factors. The present invention can be applied to frequently-used methods, such as the FDM, FEM, and IEM discussed previously in this document, and in either time or temporal-frequency domain.

Figure 5:
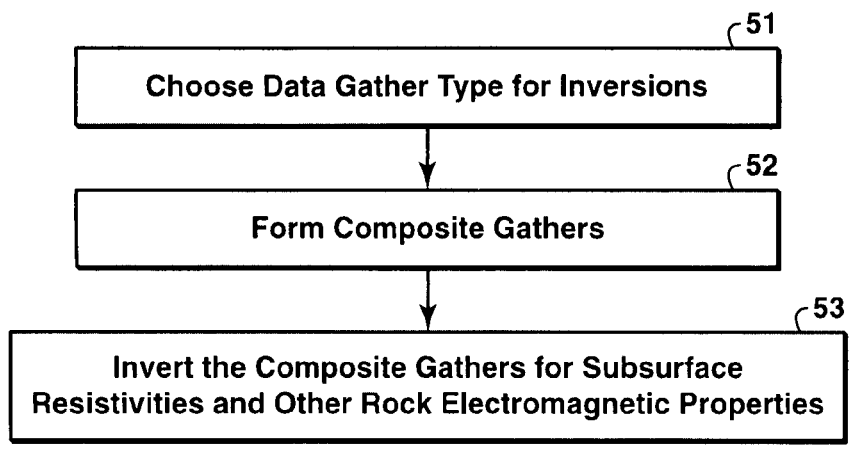
FIG. 5 is a flow chart showing basic steps in the present inventive method.

Basic steps of the present inventive method are illustrated in the flow chart of FIG. 5. At step 51, the user chooses the data gather type, common-source (or transmitter) gather or common-receiver gather, to be used for inversion for a selected CSEM survey. At step 52, composite gathers of electromagnetic data are formed by using the measured electromagnetic data in the survey according the gather type chosen in step 51. At step 53, the composite gathers generated in step 52 are inverted for the subsurface electrical-property parameters, such as the resistivity.

The selection of data in common-source gather or common-receiver gather is usually based on consideration of computational efficiency. The inversion cost is proportional to the number of gathers to be inverted. A common-source gather can be simulated in one forward modeling inside a computer. A common-receiver gather can also be simulated in one forward modeling in the same way as a common-source gather by the application of reciprocity principle (exchanging the role of transmitter and receivers). If the number of source (or transmitter) locations is smaller than the total number of active recording-channels in the survey, arranging the data in common-source (or common-transmitter) gathers will result in fewer gathers for the survey; otherwise, arranging the data in common-receiver gathers will result in fewer gathers. The data gather type that results in fewer gathers for a given survey is usually chosen for inversions. Common-receiver gathers are used in most of the illustrations of this invention since the number of common-receiver gathers is typically much smaller than the number of common-source gathers in most current CSEM surveys.

A composite gather is a supercomposition of a certain number of gathers in a survey to simulate a simultaneously active multi-source experiment. When a composite gather is a supercomposition of common-source gathers, the composite gather may also be called a multi-source (or multi-transmitter) gather herein. Similarly, a composite gather is also called a multi-receiver gather herein when the composite gather is a supercomposition of common-receiver gathers. The electromagnetic data of a composite gather can be obtained in one forward simulation similar to the forward simulation of an original gather by activating multiple sources simultaneously. The active sources in the forward simulation of the composite gather correspond to those sources of the original gathers included in the composite gather. The number of composite gathers formed from a survey can be substantially less than the number of original gathers in the survey for the same coverage. The inversion of the composite gathers is more efficient than the inversion of the original gathers included in those composite gathers because of the efficiency of the underlying forward simulation.

Figure 6:
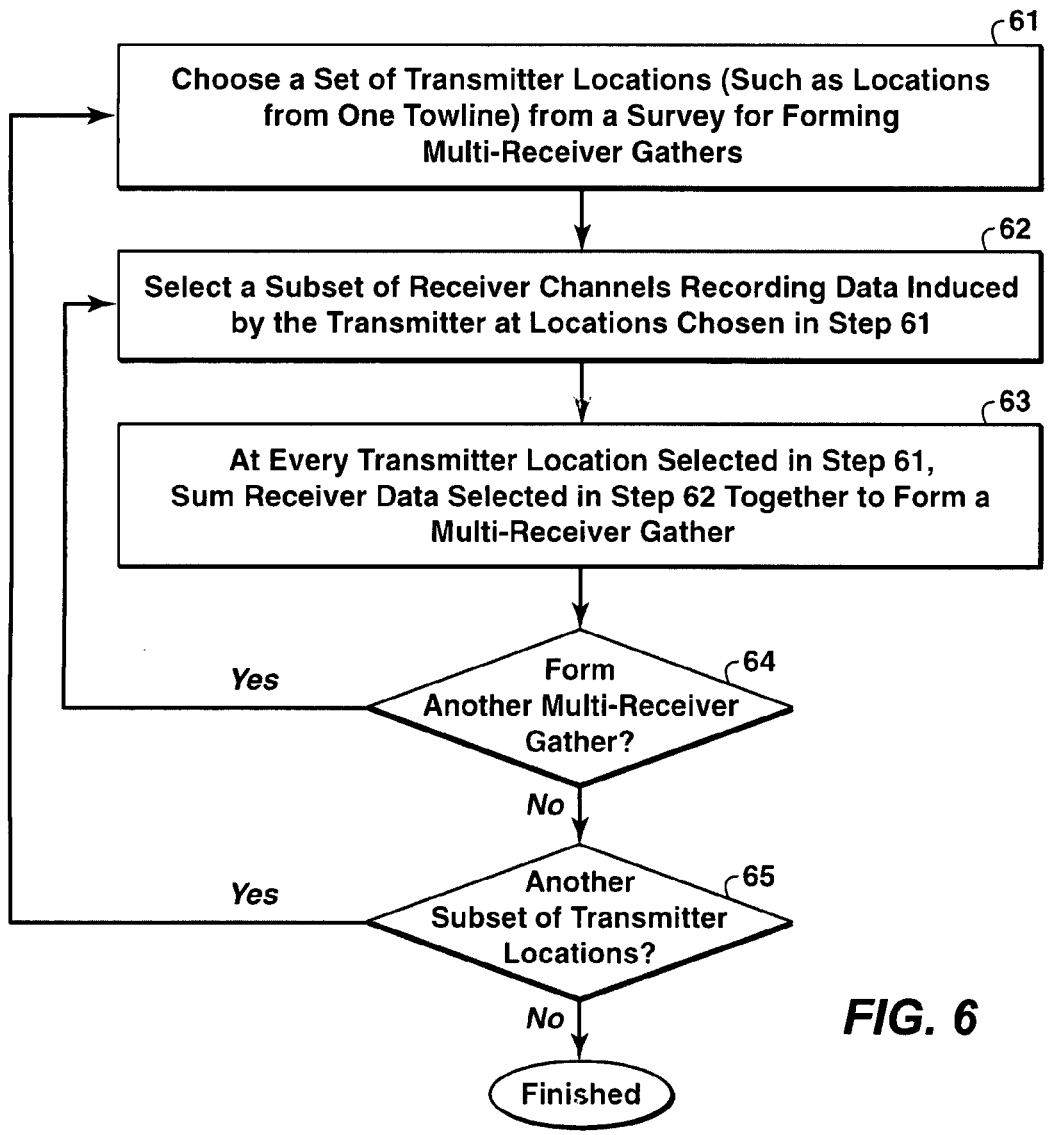
FIG. 6 is a flow chart showing basic steps in composite gather formation in an embodiment of the invention using receiver gathers.

Basic steps in forming multi-receiver gathers are illustrated in FIG. 6. The data can be in either time or temporal frequency domain. In temporal frequency domain, each frequency component needs to be summed separately, and each synchronized time sample needs to be summed separately in time domain. At step 61, a set of transmitter configurations, including both locations and orientations (such as, but not exclusively, locations from one towline), from a survey is chosen for forming multi-receiver gathers. At step 62, a subset of receiver channels recording data induced by the transmitter at locations chosen in step 61 is chosen for forming a multi-receiver gather. Preferred ways for selecting the subset of receiver channels are described below. For example, the inline component of the electric field might be the only receiver channel selected. However, in some embodiments of the invention, at least two receiver channels are selected. FIG. 9 indicates some of the possible combinations of channels that might be chosen. At step 63, at every transmitter location selected in step 61, data measured by receiver channels selected in step 62 are summed together to form a multi-receiver gather corresponding to those selected receiver channels. At step 64, it is decided whether to repeat steps 62 and 63 for one or more different subsets of receiver channels for the chosen set of transmitter locations. Steps 61-64 may then be repeated for all other desired sets of transmitter locations (step 65).

The flow chart of FIG. 6 assumes that the data are in common-receiver gathers. The procedure of forming composite gathers is the same if the data are in common-source gathers except that the roles of transmitter and receiver in FIG. 6 need to be exchanged.

In the selection of a subset of receiver channels to sum at step 62 in the flow chart of FIG. 6, a number of techniques can be used in order to sum as many gathers together as possible with a controlled level of data overlap between neighboring gathers in a multi-receiver gather, such as choosing different subsets for different frequency components and selecting different components alternatively from neighboring receivers. The major factors that need to be considered in making multi-receiver gathers include (1) the target depth range desired from inversion; (2) the frequency content of the data; and (3) the skin depth (or decay length) of the electromagnetic field in the background resistivity model of the subsurface. The details of these techniques in forming the multi-receiver gathers are described in part (B) of the following section.

The electromagnetic field value at a transmitter location along its orientation in a multi-receiver gather is the summation of the measured field values by those receivers, or possibly a phase-encoded version of the measured field values by those receivers, at the same transmitter location and of the same transmitter orientation. (The requirement for the same transmitter orientation has meaning where the transmitter is towed alone the same towline twice, but the transmitter orientations from the two tows at any of the locations along the towline may be different. The data from the two tows cannot be summed together if the orientations are not the same.) When the receiver data are encoded with certain phases in the formation of a multi-receiver gather, the same encoded phases must be applied to the corresponding source signals in the forward modeling of the multi-receiver gather using multiple active sources. Data of the same frequency component are summed together if the forward modeling is performed in the frequency domain, and data recorded at the same time are summed together if the forward modeling is performed in the time domain. The domain in which the multi-receiver gathers are formed is chosen according to the domain in which the forward modeling in the inversion is performed. The CSEM data need to be transformed to temporal-frequency domain from the measurement performed in time domain before forming multi-receiver gathers for performing the inversion of multi-receiver gather data in temporal-frequency domain.

The inversion of the multi-receiver gathers is similar to the inversion of the original gathers. A typical electromagnetic data inversion procedure is illustrated by the flow chart of FIG. 7. At step 71, an initial resistivity model and possibly models for other rock properties as needed are constructed. Available information such as well log data, water bottom topography, and seismic data, is normally used in the construction of the initial model. At step 72, the electromagnetic field in the initial model corresponding to one multi-receiver gather is modeled by activating simultaneously all the "sources" (corresponding to receivers in the field experiment) included in the multi-receiver gather. The forward modeling is performed for every multi-receiver gather formed for inversion.

At step 73, the data mismatch between the simulated data and the input multi-receiver-gather data is calculated. Any techniques applied to the inversion of the original gathers can also be applied to the inversion of the multi-receiver gathers, such as data being weighted by their amplitude in the data-mismatch calculation and any model constraints (or regularization) applied in the inversion for mitigating the non-uniqueness of the model solution. At step 74, the data mismatch is compared to a preset tolerance level. If the data mismatch reaches the tolerance level, the current resistivity model is the final model from the inversion and the inversion process is done. Otherwise, the resistivity model is updated at step 75 as the new initial model and steps 72-75 are repeated until the pre-selected convergence criterion or other stopping condition is met at step 74.

Figure 7:
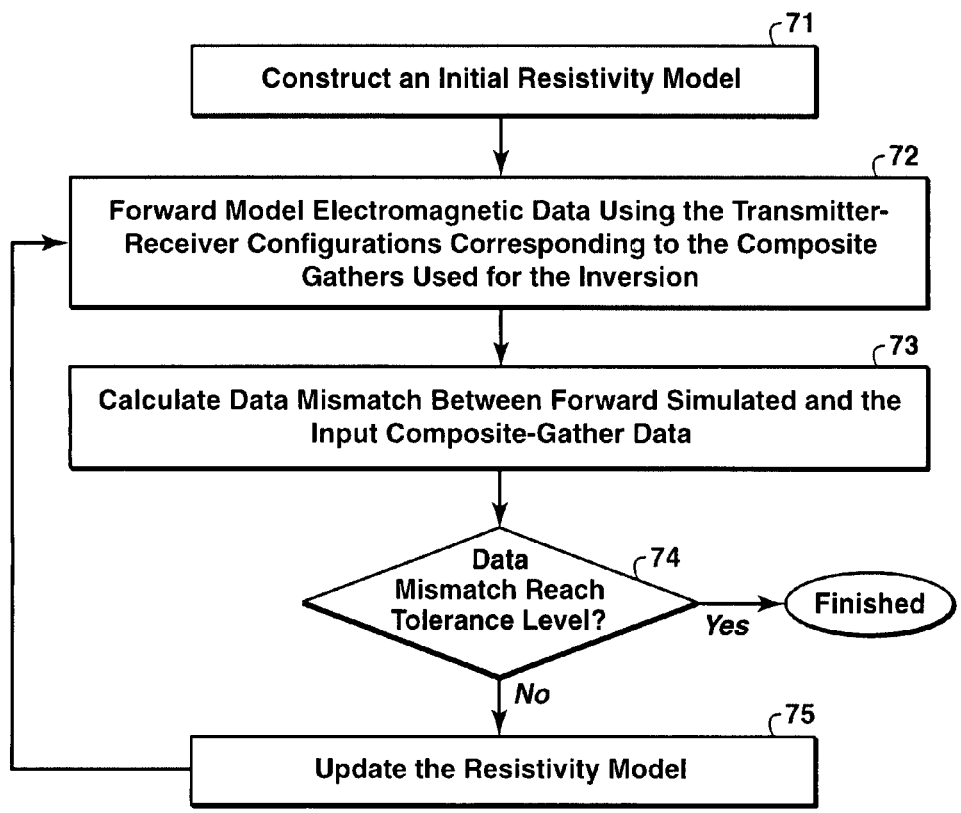
FIG. 7 is a flow chart showing basic steps in electromagnetic data inversion in one embodiment of the present invention.

The inversion and the forward modeling used in the inversion process can be performed in either temporal-frequency domain or time domain, and the flow chart of FIG. 7 is applicable to both domains. In some applications, the user may wish to invert some ordinary gathers along with composite gathers. Next, certain features of the invention will be discussed in more detail.

(A) Forming Multi-Receiver Gathers

Figure 8A:
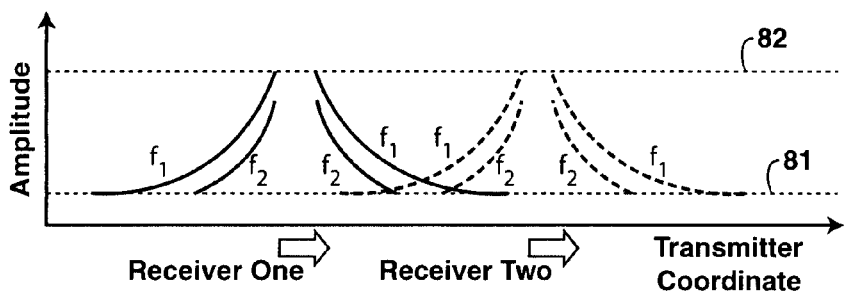
FIGS. 8A-B illustrate how two common-receiver gathers are summed to form a single composite gather.
Figure 8B:
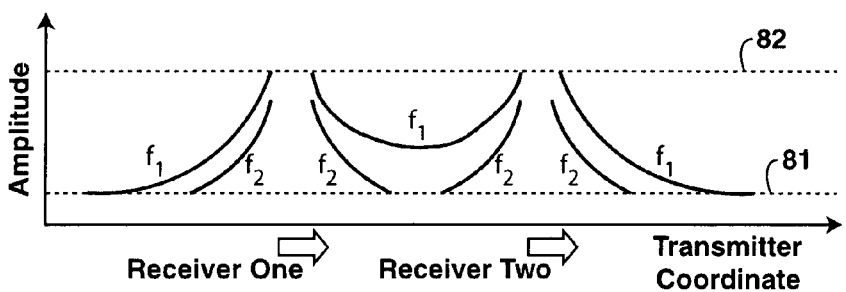

The present invention reduces the computation time for inversion by reducing the effective number of independent forward simulations. This is achieved by summing over measured data at the same frequency from a number of receiver gathers for the same set of towlines to form a multi-receiver gather. Electromagnetic data are generally represented by either complex (as opposed to real) numbers or amplitudes and phases. The summation of electromagnetic data generated from a transmitter at a specific location and recorded by receiver antennae at different locations is a direct sum of the measured voltage values across the receiver antennae possibly encoded with certain phases in the form of complex numbers at those receiver-antenna locations. FIG. 8A shows two receiver gathers of the inline-component (along the towline direction) electric field plotted vs. transmitter position along the transmitter-towline direction, solid lines at the location of receiver one and dashed lines at the location of receiver two. The multi-receiver gather formed from the inline-component electric field measured at the two different receiver locations is shown in FIG. 8B. Two different frequency components, labeled as $f_1$ and $f_2$ on the plots, are shown ($f_1 < f_2$). The gathers shown in FIG. 8B are amplitude curves formed by summing, one frequency at a time, the electric-field curves of the two receivers whose amplitude curves are shown in FIG. 8A. The effect of this summing is clearly shown by the result for frequency $f_1$ between receiver one and receiver two. The effect of the summation at other locations is too small to be clearly observed in this example. Data below background noise level 81 and above the receiver saturation level 82 are muted in the plots as indicated by the two horizontal dotted lines.

After using the reciprocity principle (or exchanging the role of transmitters and receivers for the purpose of simulation), a multi-receiver gather of the measured data (such as FIG. 8B) is equivalent to a physical experiment with multiple transmitters operating simultaneously at the receiver antenna locations in the original experiment and recording the fields with the transmitter antenna at transmitter locations in the original experiment. The equivalent experiment of a multi-receiver gather can be simulated in the computer by one forward simulation with multiple active transmitters at those receiver locations in the original survey. Thus, the multi-receiver gather can be inverted in the same way as inverting one original receiver gather.

If the number of common-source gathers (which will be governed by the selection of the transmitter bin size) is smaller than the number of common-receiver gathers in a survey (which is governed by the number of receivers in the survey), inverting data in common-source gathers will be more efficient. The reciprocity principle does not need to be applied. (In fact, using reciprocity is not an essential feature of the invention regardless of whether common-receiver gathers or common-source gathers are used.) The formation of composite gathers, which are multi-source gathers in this case, and forward simulation can be performed directly to the common-source gathers in the original survey. A multi-source gather is a collection of different receiver antennae, and the data in each of the receiver antennae are the sum of data induced by the electromagnetic sources included in this multi-source gather. Again, a multi-source gather is equivalent to a physical experiment with multiple transmitters operating simultaneously.

Figure 9A:
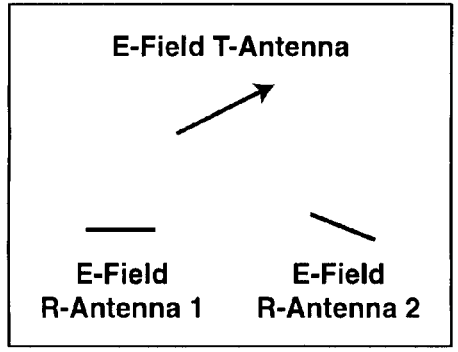
FIGS. 9A-F illustrate various transmitter and receiver antenna combinations that can be used to form multi-receiver gathers in the present invention.
Figure 9D:
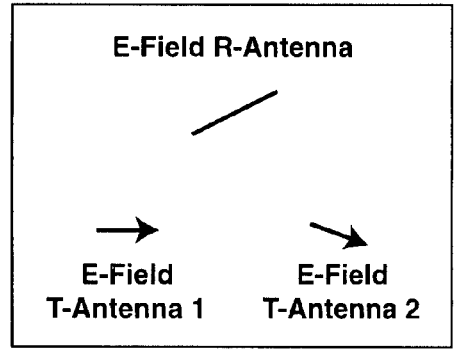
Figure 9B:
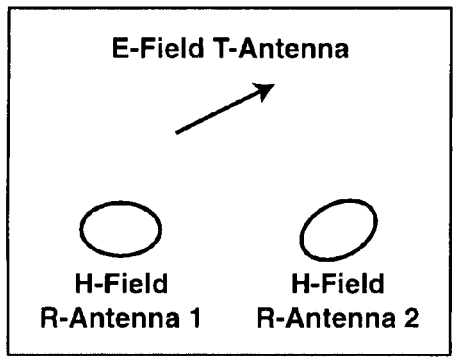
Figure 9E:
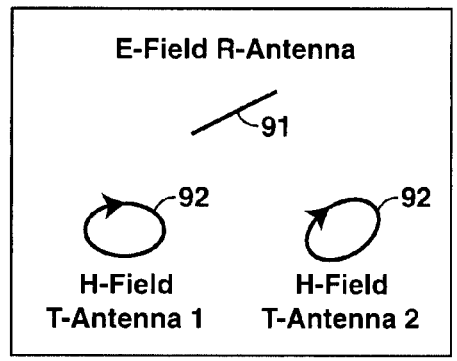
Figure 9C:
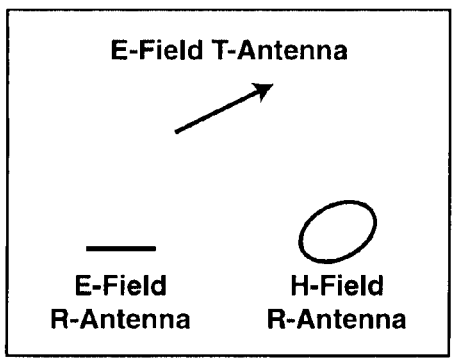
Figure 9F:
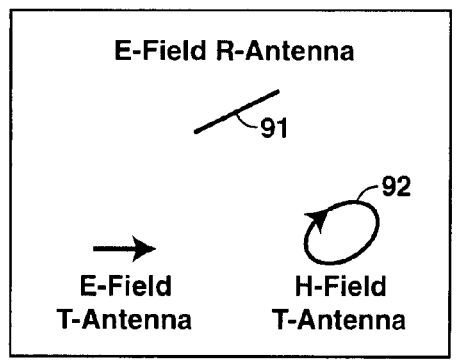

The formation of composite gathers from gathers in an original experiment can be applied to electric data, magnetic data, or a linear combination of both. FIGS. 9A-F show transmitter-receiver configurations for forming multi-receiver gathers with an electric field transmitter antenna ("E-field T-antenna") and different types of receiver antennae ("R-antenna"). Lines represent electric field antennae and circles represent magnetic field antennae. An arrow head denotes a transmitter antenna rather than a receiver antenna, and indicates the source current direction. FIGS. 9A, 9B and 9C correspond to CSEM field experiments with an electric field transmitter antenna and two receiver antennae. The receiver antennae are: two electric field receiver antennae in FIG. 9A; two magnetic field receiver antennae (circular loops) in FIG. 9B; and one electric field receiver antenna and one magnetic field receiver antenna in FIG. 9C. FIGS. 9D, 9E and 9F are configurations for simulating the multi-receiver gathers for the corresponding field experiments 9A, 9B and 9C, respectively, after applying the reciprocity principle. The transmitter electric current in the original experiments is, upon applying reciprocity, injected to the receiver antennae in the original field experiments, and these antennae are used as transmitter antennae in the computation of the fields corresponding to the multi-receiver gathers.

The electric field and magnetic field are related to each other by Maxwell's equations. One can simulate either the electric field only and derive the magnetic field from the electric field as needed or the magnetic field only and derive the electric field from the magnetic field as needed, or simulate both the electric field and magnetic field simultaneously. The simulation of electric field is chosen for the configurations in FIGS. 9A-F.

Similar to an electric-field antenna which measures the induced voltage in a straight wire, a magnetic-field receiver antenna measures the induced voltage in a coil. This voltage can be converted to magnetic field by using equipment parameters, such as, the coil diameter, the number of turns of the coil, the material magnetic permeability in the core of the coil, amplifier parameters, and so on. The voltage can also be converted to an effective voltage that would have been measured by a single-turn circular antenna with material in the core having the same magnetic permeability as that of the background material at the receiver location. This single-turn antenna may be called an effective magnetic-field receiver antenna, which can be more easily modeled as a magnetic-field transmitter by computer simulation. According to the reciprocity principle, this effective voltage is the same as the voltage measured across the original electric transmitter antenna (91 in FIGS. 9E and 9F) if the original transmitter current is injected into the single-turn circular antenna, or the effective magnetic field antenna (92 in FIGS. 9E and 9F). When forming a multi-receiver gather including magnetic field receiver antennae, one can still sum the voltage values measured by both the electric-field antennae and effective magnetic-field antennae. This multi-receiver gather can be modeled in one simulation by activating all the electric-field receiver antennae and effective magnetic-field receiver antennae simultaneously.

FIGS. 9A-F show cases with an electric-field transmitter antenna in the original CSEM survey. A skilled person in this field will readily be able to make a multi-receiver gather for a survey with a magnetic-field transmitter antenna in a similar way to that described above for an electric-field transmitter antenna.

The formation of a composite gather can be performed in either temporal-frequency domain or time domain. Its selection should be consistent with the domain of the forward modeling used in the inversion. When the forward modeling is performed in frequency domain, data of the same frequency component are summed together, and data recorded at the same time are summed together if the forward modeling is performed in time domain. The multi-receiver gather example shown in FIGS. 8A-B is in frequency domain.

Figure 1:
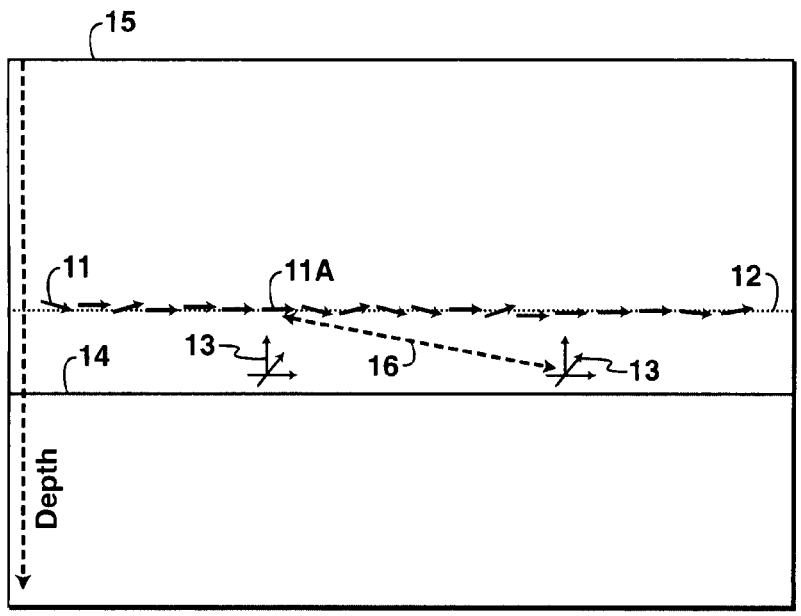
FIG. 1 is a schematic plot of a marine CSEM survey with multi-component electromagnetic receivers located on the sea floor.
Figure 2A:
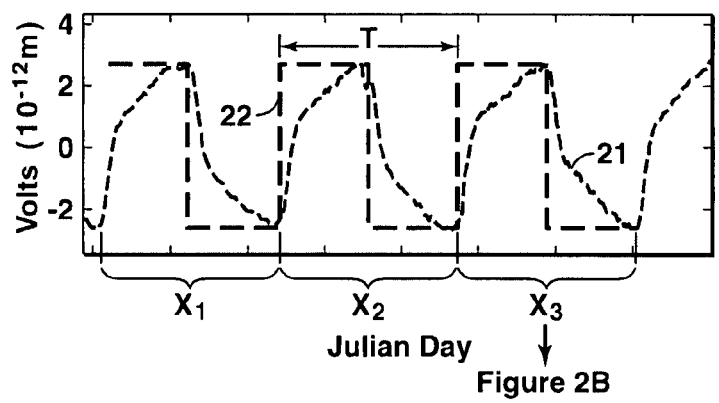
FIGS. 2A-B illustrate the process of binning a receiver signal in time and determining the frequency spectrum within each bin by Fourier analysis.
Figure 2B:
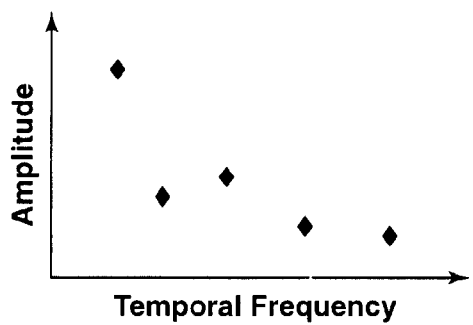
Figure 3A:
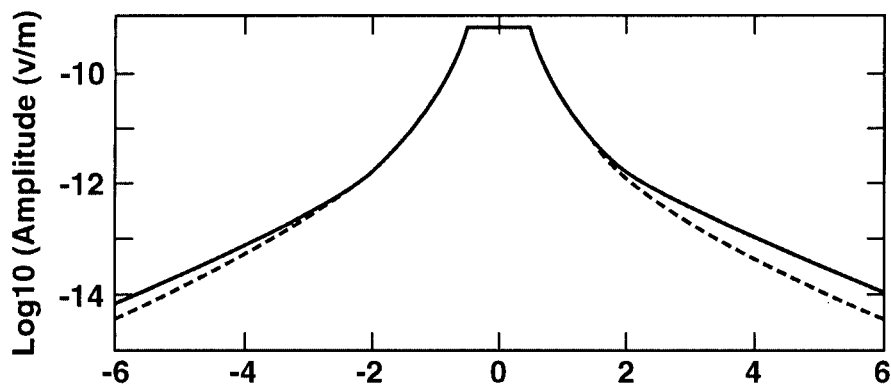
FIG. 3A shows the effect of a resistive reservoir on amplitude and the saturation zone near the receiver location (absolute offset roughly less than 500 m)
Figure 3B:
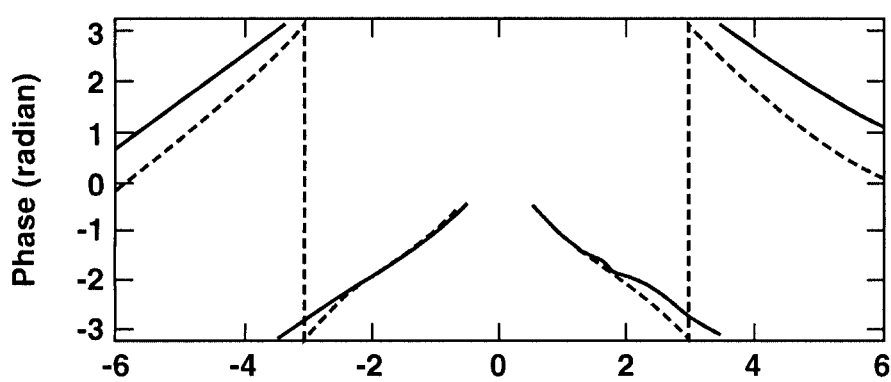
FIG. 3B shows the effect of a resistive reservoir on phase.

Theoretically, all receiver gathers in a survey can be summed together forming one multi-receiver gather for the inversion, achieving a maximum speedup factor equal to the number of receivers in the survey. In such a case, one would have data such as that shown in FIG. 8A (except that data from every receiver would appear rather than just two) for every tow line in the survey, and would sum field values from every receiver to get a single value at each transmitter coordinate.
(B) Data Overlap in a Composite Gather and its Mitigation The amplitude of the electromagnetic field in a conductive medium decays exponentially with distance from the electromagnetic source as shown in FIG. 3A. Data outside of the saturation zones and above the noise-floor level can be used for inversions. Data at larger offsets (distance between the transmitter and the receiver) generally contain subsurface conductivity information at deeper depths and are valuable for detecting deeper conductivity anomalies.

Figure 10A:
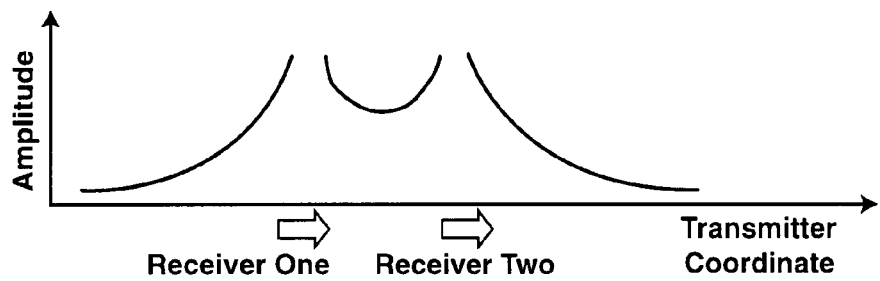
FIGS. 10A-C show summed electric field amplitudes of one frequency component from receiver gathers at different separations, illustrating the domination by near-offset data in a composite gather with closely spaced receivers.
Figure 10B:
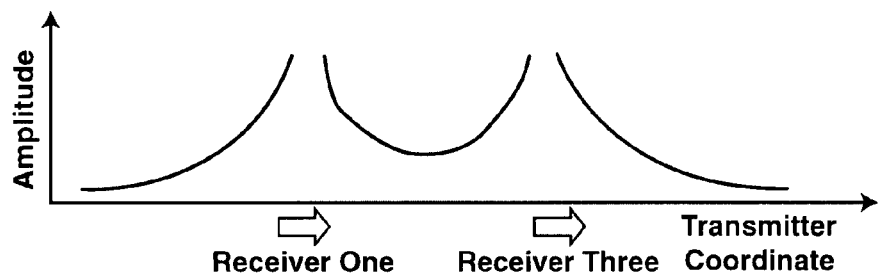
Figure 10C:
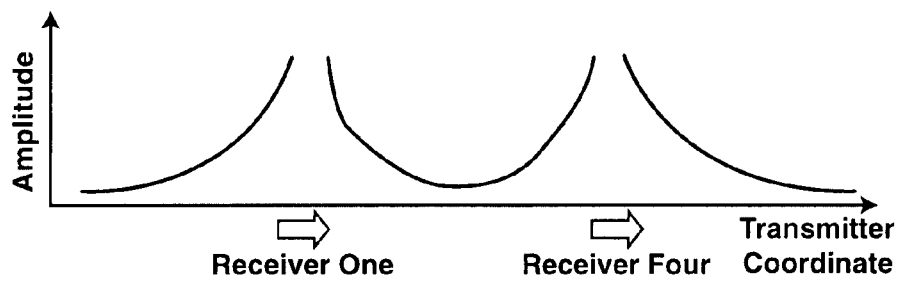

One negative effect of forming composite gathers is the reduction in detectable depth range from the composite-gather data. Summing two receiver gathers together can produce a significant data-overlap zone between the two receivers. The closer the two receivers are, the more the data in the overlap zone are restricted to short offsets. Due to the fast decay of the electromagnetic field with offset, the summed electromagnetic fields at most of the transmitter locations are dominated by the near offset data from the receiver closest to the transmitter locations. FIGS. 10A-C show multi-receiver gathers resulting from the summation of two receiver gathers at three different receiver separations. These drawings demonstrate, as stated above, that the closer the two receivers are, the more the summed data is dominated by near-offset data. Near-offset data primarily contain subsurface conductivity information from the shallow section. The data overlap from summing different receiver gathers together reduces the detectable depth range for subsurface conductivity anomalies. However, it is important to point out that the multi-receiver gather is entirely equivalent to an experiment with, multiple active sources corresponding to the receivers included in the multi-receiver gather no matter how much the field from different receivers overlap. The decrease in sensitivity for detecting deep resistive anomalies is the effect of the equivalent multiple-source experiment corresponding to the multi-receiver gather, not the effect of any approximation.

Figure 4:
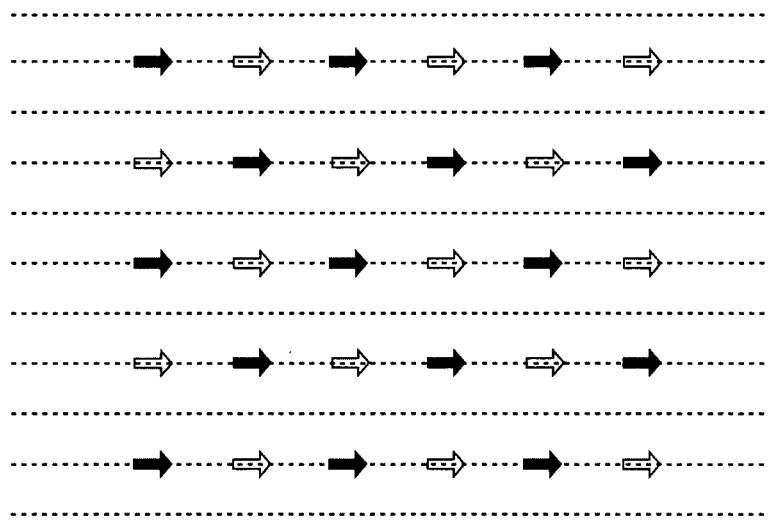
FIG. 4 shows receiver deployment and transmitter tow lines for a typical reconnaissance marine CSEM survey.

One way to mitigate the data overlap is to sum a subset of the receiver gathers in a survey. As an example shown in FIG. 4, two multi-receiver gathers can be produced by separately summing the data from receivers at locations marked by black and white arrows. This would result in two independent multi-receiver gathers for inversion compared to 30 independent gathers (one gather per each of the 30 receivers) of the original data resulting in an approximate 15-fold increase in inversion efficiency.

Figure 11A:
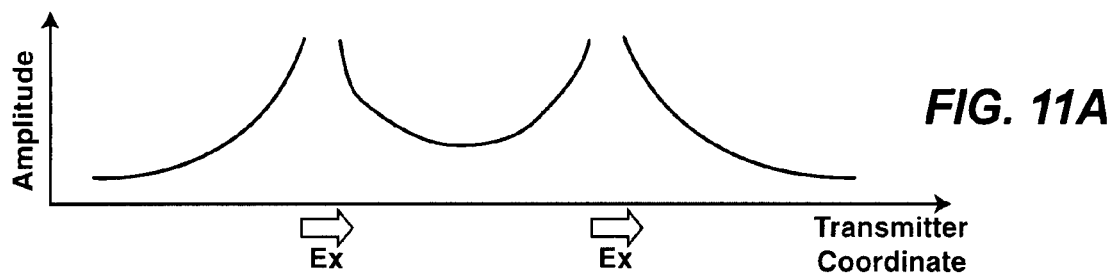
FIGS. 11A-B illustrates how reduction of data overlap in composite gather formation can sometimes be achieved by using different channels (different electromagnetic field components)
Figure 11B:
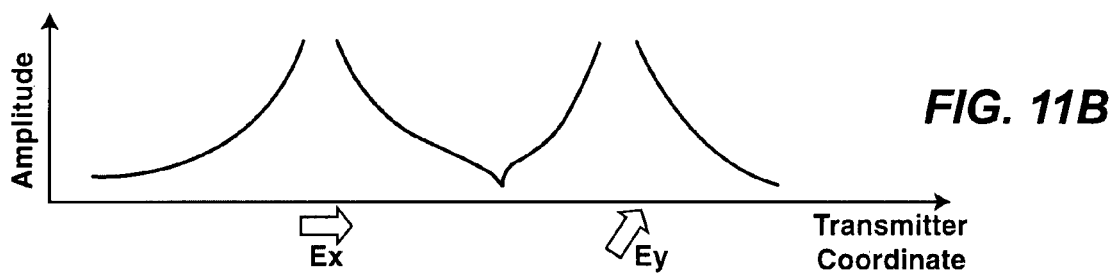

Another way to mitigate the data overlap is to sum different components of the electromagnetic field from neighboring receivers. The component parallel to the towline direction (inline component) is usually much stronger than the component perpendicular to the towline direction (cross-line component) when the towline is directly over (or very close to) the receivers. By summing inline and cross-line components from neighboring receivers alternatively, the data overlap can be reduced and more of the far-offset data can be preserved. One example is shown in FIGS. 11A-B, which show that the data overlap between the two receivers is reduced in the multi-receiver gather by summing one inline component and one cross-line component (FIG. 11B) compared to summing both inline components of the same set of receivers (FIG. 11A). In specific surveys, it may be possible to find combinations of inline, cross line, and vertical vector components that minimize the data overlap.

The dominant factor affecting the data overlap in a multi-receiver gather is the ratio of the receiver separation over the decay length (or called skin depth) of the electromagnetic field. The decay length of the electromagnetic field is proportional to $1/\sqrt{f\sigma}$, where f is frequency and $\sigma$ is earth's conductivity. The decay length at a higher frequency is shorter than that at a lower frequency (see FIG. 8A). The data of frequency component $f_2$ in FIG. 8A show no overlap in the offset range of signal above the noise floor (indicated by the lower horizontal dotted line 81). More receiver gathers from a survey can be summed into a multi-receiver gather for inversions at a higher frequency than at a lower frequency for the same level of data overlap. Different subsets of receivers can be used for summing data of different frequency components achieving the maximum speedup factor for a certain level of data overlap.

The optimal choice of a subset of receivers to sum thus depends on the depth range of interest, the earth's conductivity, the frequency of the data, and the survey parameters. The amount of data loss can be evaluated by comparing multi-receiver data formed from receivers at different separations in a survey as shown in FIGS. 10A-C before making the final multi-receiver gathers for inversions. Inverting conductivity at shallower targets and/or using higher-frequency data for inversion allows summing receiver gathers more closely spaced than inverting deeper targets and/or using lower frequency data for inversion. When performing inversions targeted to observable anomalies on individual receiver gathers, the receiver spacing in a multi-receiver gather should be large enough so that the anomalies are observable on the multi-receiver gather.
(C) Phase Encoding Informing Composite Gathers Different receiver gathers can be encoded by different phases when forming multi-receiver gathers. The same encoded phases applied to receiver data should also be applied to the corresponding source signals used in the forward modeling. With a proper phase encoding, the reduction in data sensitivity to subsurface resistivity of the multi-receiver-gather data can be mitigated.

Figure 12A:
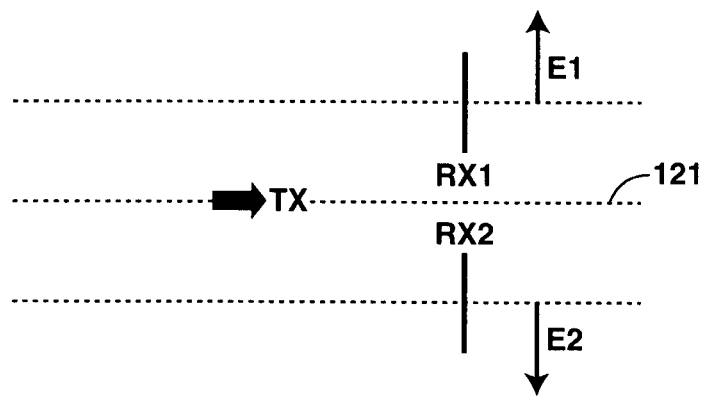
FIGS. 12A-C illustrate how data phase differences can lead to unwanted data cancellation when the data are summed in composite gather formation, unless phase encoding is used.
Figure 12B:
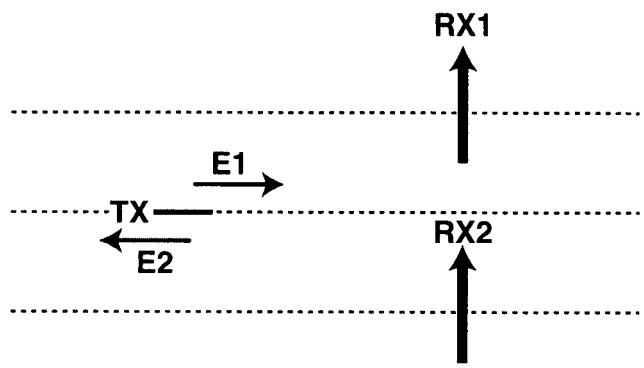
Figure 12C:
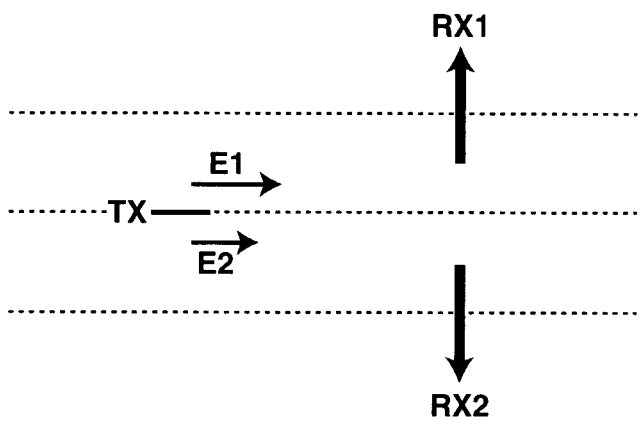

FIGS. 12A-C illustrate forming multi-receiver gathers with phase encoding which can avoid signal-cancellation effect from summing two field values of opposite phases. The map views of the transmitter-receiver configuration, electric current directions in the source antennae (thick arrows), and electric fields (thin arrows, E1 and E2) along the receiving antennae (solid lines) are shown in FIGS. 12A-C. FIG. 12A shows the electric fields E1 and E2 measured by two receiver antennae (RX1 and RX2) oriented perpendicular to the transmitter (TX) orientation in the original survey. The two receiver antennae are located at the opposite sides relative to the center transmitter towline (center dashed line 121), and at the same distance from the transmitter location (TX). In the case of a subsurface resistivity profile close to a one-dimensional layer cake model, the measured field values E1 and E2 will have similar amplitudes but opposite phases as illustrated by the opposite direction in FIG. 12A. If the fields from the two receivers are summed together without applying any phase encoding to the receiver data, the field in the multi-receiver gather will be very weak due to the cancellation of the two fields, which will impact the effectiveness of the inversion with this multi-receiver-gather data.

FIG. 12B shows the configuration corresponding to the forward modeling of the multi-receiver gather without phase encoding (or encoded with zero-degree phases to both receivers in FIG. 12A) after applying the reciprocity principle. In FIG. 12B, the electric current in the original transmitter is injected into both receiver antennae (RX1 and RX2) in the same direction (thick arrows) as two simultaneously-active sources. The original transmitter antenna (TX) measures the field from the two sources. The fields (E1 and E2) from the two sources have opposite phases just like that in the original survey in FIG. 12A. The field in the antenna from the two simultaneously-active sources is artificially weakened by the cancellation effect compared to the fields from each of the two sources.

FIG. 12C shows the configuration corresponding to the forward modeling the multi-receiver gather of receiver RX1 and RX2 with encoded phases of zero degrees for RX1 and 180 degrees for RX2 after applying the reciprocity principle. With this set of encoded phases, the electric current in the original transmitter is injected into receiver antenna RX1 and RX2 in the opposite directions (thick arrows) as two simultaneously-active sources. This results in fields (E1 and E2) from the two sources that are in phase relative to each other. The field measured by the original transmitter antenna (TX) for this phase-encoded multi-receiver gather in FIG. 12C is not weak anymore compared to the fields from each of the two sources. The phase encoding in FIG. 12C is a better choice than that in FIG. 12B for the transmitter-receiver configuration in FIG. 12A.

Phase encoding has been previously discussed in other geophysical contexts. For example in the area of seismic migration, see Julien et al., "3-D Prestack Depth Migration on Real Data", 60th Annual International Meeting, SEG, Expanded Abstracts, 1329-1332 (1990); U.S. Pat. No. 6,021,094 to Ober et al.; or Jing et al., "Encoding multiple shot gathers in prestack migration", 70th Annual International Meeting, SEG, Expanded Abstracts, 786-789 (2000). Those publications apply the standard seismic migration method to phase-encoded seismic records. Seismic migration is an approximate imaging technique based on correlating synthesized seismic data against seismic records that have been numerically propagated backward in time.

Scalar seismic data represent either the pressure field or particle-velocity field of acoustic waves which obey the acoustic wave equation. Vector electromagnetic data discussed in the present invention represent the electric and/or magnetic fields of electromagnetic waves which obey the Maxwell's wave equations. In addition to the obvious differences between the scalar seismic data and the vector electromagnetic data discussed in the present invention, the migration of the phase-encoded seismic records disclosed in those publications inevitably generates false events in the migrated subsurface images resulting from the cross terms of different seismic records appearing in the correlation. The phase-encoding of the seismic records before migration is the essential part of the seismic migration method in those publications. The phase-encoding functions developed by those authors, such as Ober et al. and Jing et al., are specifically designed to mitigate false events in the migrated image, and that is inherently an approximate method. To the contrary, the inversion of the composite-gathers formed from CSEM data described in this invention does not have any inherent approximation or generate any false anomaly in the subsurface resistivity image. The inversion of composite gathers is as exact as the inversion of original CSEM data, even though the composite-gather data may not offer the same level of sensitivity to a subsurface resistivity anomaly. The encoding functions described in the present application are designed to reduce the loss of sensitivity to a subsurface resistivity anomaly due to the data overlap in composite gathers. The phase encoding is not an essential part of the present invention.

(D) Other Factors Related to Forming Composite Gathers

Both the phase and amplitude of CSEM data should be accurately determined before forming composite gathers so that the interference between in-phase and out-of-phase components is properly represented in the composite gathers.

Data within the saturation zones around each of the receiver locations in composite gathers should preferably not be used for inversion (see FIGS. 8A-B). This is because the amplitudes in the saturation zones are not preserved correctly in the composite gathers even through the amplitudes for some of the original receivers included in the composite gather may be correct.

In an offset window where the signal is above the noise floor, if data from any of the original individual gathers included in a composite gather are not reliable for inversion, the composite-gather data in the same offset window should preferably not be used in inversion.

Data that fall below the noise floor in the original individual gathers may be set to zero before data summation in order to avoid contaminating the composite-gather data by the background noise from the original individual gathers. Even through contributions to the composite gather from some of the original individual gathers are ignored in some offset windows, the composite gather should still be usable for inversions in those offset windows. This is because signal below the noise floor is weak compared to signal above the noise floor from some other receivers in the composite gather.

The formation of a multi-receiver gather, with or without phase-encoding, requires that the transmitter locations and orientations are the same for all the receivers to be summed together. In other words, the receiver gathers to be summed need to be from receivers recording the same transmitter towlines. If the towlines differ as well as the receivers, the gathers must be summed into different multi-receiver gathers. A similar requirement is true for forming a multi-source gather except the roles of source and receiver need to be exchanged.

(E) Applications and Benefits

The inversion technique of the present invention can speed up inversions by a factor up to the number of receivers deployed in a survey. This technique is most valuable for reconnaissance surveys that usually cover a large area with a relatively sparse grid of receivers and towlines. The present inventive method makes it possible to quickly identify subsurface conductivity anomalies over a large area. If desired, traditional CSEM inversions using the original individual gathers can then be performed to the identified target area for more accurate imaging of the anomaly.

In addition to reconnaissance surveys, other applications include:

(1) constructing more reliable initial conductivity models for the traditional CSEM inversions using the original individual gathers;

(2) reducing inversion time cycle for surveys of dense receiver coverage and/or large coverage area; and (3) using the time saved by reducing the number of gathers to include additional frequencies and produce a more accurate conductivity model with improved depth resolution. Also, this invention is more effective for high-frequency data than for low-frequency data. Often, this would mean using higher frequencies, resulting in additional improvements to the shallow portions of the image. Improved knowledge of the shallow conductivities in turn improve the deeper portions of the image since electrical current passing through the deeper section must necessarily pass through the shallow section as well.

EXAMPLE

Figure 13A:
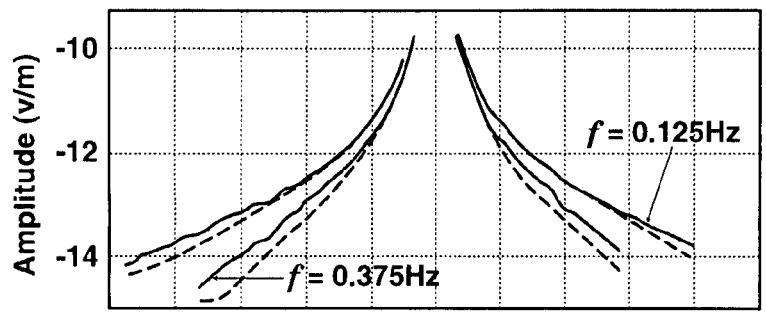
FIGS. 13A-D show results of a simulated experiment to test the present inventive method.
Figure 13B:
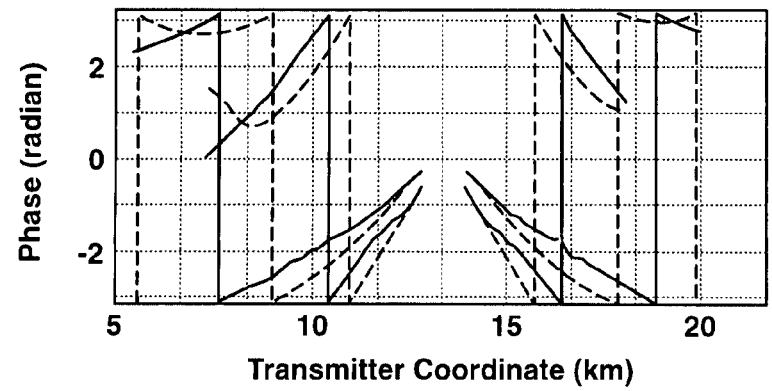
Figure 13C:
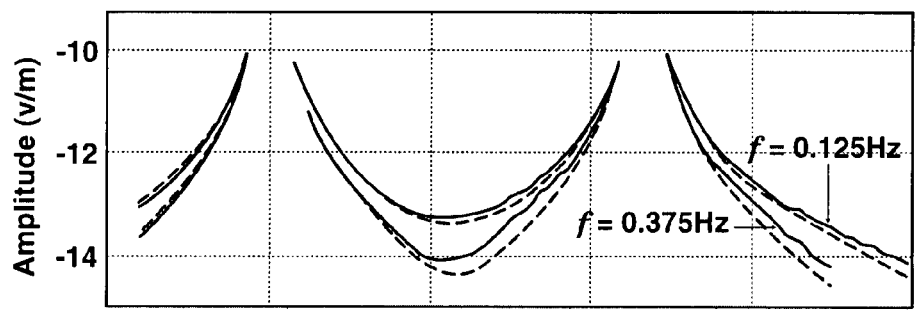
Figure 13D:
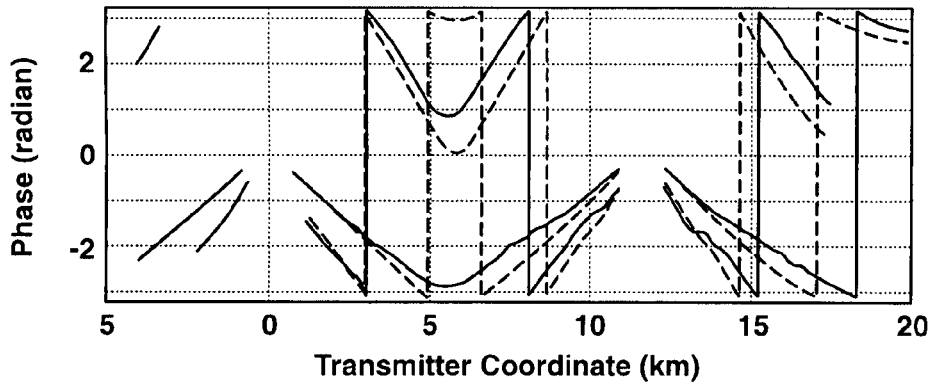

A synthetic CSEM dataset was generated using a three-dimensional resistivity model. The amplitudes and phases versus transmitter coordinate in kilometers along the transmitter towline in one of the horizontal receiver gathers are shown at two different frequencies (as indicated on the plots) by solid curves in FIGS. 13A and 13B, respectively. A multi-receiver-gather dataset was created by summing the individual horizontal-component synthetic gathers. The amplitudes and phases for one of the multi-receiver gathers are shown by solid curves in FIGS. 13C and 13D, respectively. The original gather shown in FIGS. 13A and 13B is one of the original individual gathers forming the multi-receiver gather shown (at x≈12 km) in FIGS. 13C and 13D.

The inversion described in this invention was performed on the multi-receiver-gather dataset. The initial model for the inversion and final model from the inversion were then used in forward modeling the electric fields. Data modeled by using the initial background model, which is different from the actual model used in the generation of the synthetic dataset, are plotted in dashed curves in FIGS. 13A-D. Data modeled by using the final model from the inversion of the multi-receiver gathers are plotted in dotted line in FIGS. 13A-D. It can be seen from FIGS. 13C and 13D that the multi-receiver-gather data generated from the final model (dotted curves) are almost indistinguishable from the multi-receiver-gather data (solid curves) used for driving the inversion process.

The forward modeled data for the individual gathers as in the original survey (dotted curves in FIGS. 13A and 13B) using the final model from the inversion also show a good match to the original synthetic data (solid curves) generated from the actual model. This demonstrates that the data overlap in the multi-receiver gathers used for the inversion in this example does not result in observable reduction in the capability to match the original individual gathers. As the data overlap increases in the multi-receiver gathers, the capability to match the original individual gathers will decrease especially at far offsets of the gathers.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A computer implemented method for rapid inversion of electromagnetic data from a controlled source electromagnetic survey of a subterranean region, comprising:

(a) summing measured electromagnetic survey data, using a computer, to form one or more composite gathers, each composite gather being formed from at least two selected ordinary gathers, said ordinary gathers being either common-receiver or common-source gathers; wherein loss of sensitivity to a subsurface resistivity anomaly due to data overlap or data cancellation, or both, in the one or more composite gathers is mitigated; wherein said loss of sensitivity is defined relative to sequential inversion, meaning inverting one ordinary gather at a time;

wherein data overlap is mitigated by one or more of the following measures when forming the one or more composite gathers: (i) summing only a subset of the ordinary gathers in the survey, depending upon one or more of depth range of interest, earth conductivity, frequency of the data, and other parameters of the survey; (ii) preserving far-offset data by summing only selected components of the electromagnetic field from neighboring receivers; and wherein data cancellation is mitigated by phase encoding the ordinary gathers in forming the one or more composite gathers; and (b) inverting the composite gathers, using a computer, for resistivity or another subsurface electrical-property parameter.

2. The method of claim 1, further comprising inverting at least one ordinary gather with the composite gathers.

3. The method of claim 1 wherein the ordinary gathers are common-receiver gathers and summing measured electromagnetic survey data to form a composite gather comprises:

(i) selecting a set of transmitter (source) locations for forming the composite gather;

(ii) selecting at least one electromagnetic field data component for each selected ordinary gather; and (iii) at every selected transmitter location, summing all selected data components from all selected ordinary gathers, thereby forming the composite gather.

4. The method of claim 1, wherein the ordinary gathers are common-source gathers and summing measured electromagnetic survey data to form a composite gather comprises:

(i) selecting a set of receiver locations for forming the composite gather;

(ii) selecting at least one electromagnetic field data component for each selected ordinary gather; and (iii) at every selected receiver location, summing all selected data components from all selected ordinary gathers, thereby forming the composite gather.

5. The method of claim 3 or claim 4, wherein the selection of ordinary gathers and electromagnetic field components for the composite gather is governed by consideration of factors including (i) reducing degree of data overlap between neighboring ordinary gathers to preserve contributions from longer offsets and (ii) enhancing inversion efficiency by increasing the number of ordinary gathers in one composite gather.

6. The method of claim 5, wherein ordinary gathers are selected to have receiver spacing in the case of common-receiver gathers or source spacing in the case of common-source gathers great enough to reduce data overlap to a predetermined level.

7. The method of claim 5, wherein at least two different electromagnetic field components are selected alternately from neighboring ordinary gathers to reduce data overlap.

8. The method of claim 5 wherein an additional factor considered is a pre-selected depth range of interest in the subsurface region.

9. The method of claim 5, wherein the method is performed in frequency domain, and the selection of ordinary gathers to reduce data overlap is frequency dependent.

10. The method of claim 1, wherein said inverting the composite gathers comprises:
   (i) constructing an initial resistivity model;
   (ii) forward modeling at least one electromagnetic field component, wherein Maxwell's electromagnetic field equations are numerically solved assuming the resistivity model and with all sources associated with the composite gather assumed to be simultaneously active, thus generating simulated data;
   (iii) calculating data mismatch between the simulated data and the measured survey data for the corresponding composite gathers; and
   (iv) adjusting the resistivity model to reduce the data mismatch repeating steps (ii) to (iv) until a preset tolerance level or other stopping point is met.

11. The method of claim 10, wherein said adjusting the resistivity model is done by minimizing an objective function, said objective function being selected so as to be a measure of the data mismatch.

12. The method of claim 1, wherein the summing and inverting steps are performed in time domain.

13. The method of claim 1, wherein the summing and inverting steps are performed in frequency domain, wherein time dependence of measured survey data are transformed to frequency dependence.

14. The method of claim 1, wherein common-receiver gathers are used to form the composite gathers if the survey has more source positions (as determined by data binning strategy in the case of a moving source) than receiver positions, and otherwise common-source gathers are used.

15. The method of claim 1, wherein the survey has more source positions (as determined by data binning strategy in the case of a moving source) than receiver positions, and common-receiver gathers are used to form the composite gathers, and wherein source and receiver roles are exchanged (reciprocity invoked) for forward-modeling computations in the inverting step.

16. The method of claim 1, wherein phase encoding is used in forming composite gathers and in forward-modeling computations associated with the inverting step to avoid signal cancellation from summing two electromagnetic field values of opposite phase.

17. The method of claim 1, wherein the measured survey data to be summed includes magnetic field data.

18. The method of claim 17, wherein reciprocity of source and receiver is invoked in forward modeling calculations in the inverting step, and wherein computational magnetic sources (corresponding to actual magnetic receivers) are each modeled as an effective single-turn circular antenna with core material of the same magnetic permeability as background material at the actual receiver's location.

19. The method of claim 10, wherein the forward modeling uses a method selected from a group consisting of (a) finite difference method; (b) finite element method, and (c) integral equation method.

20. A method for producing hydrocarbons from a subsurface region, comprising:
   (a) performing a controlled-source electromagnetic survey of the subsurface region;
   (b) obtaining a resistivity model of the subsurface region produced by inverting electromagnetic data measured in the survey, said inversion having been performed by using a method of claim 1;
   (c) drilling a well into a zone indicated as an anomaly in the resistivity model; and
   (d) producing hydrocarbons from the well.

21. The method of claim 16, wherein the phase encoding is performed using encoding functions that are designed to reduce the signal cancellation.

* * * * *